(12) United States Patent
Goetz

(10) Patent No.: US 6,382,668 B1
(45) Date of Patent: May 7, 2002

(54) AIR BAG INFLATOR

(75) Inventor: George W. Goetz, Fountain Hills, MI (US)

(73) Assignee: TRW Vehicle Safety Systems Inc., Lyndhurst, OH (US)

( * ) Notice: Subject to any disclaimer, the term of this patent is extended or adjusted under 35 U.S.C. 154(b) by 0 days.

(21) Appl. No.: 09/714,611

(22) Filed: Nov. 16, 2000

(51) Int. Cl.⁷ ................................................ B60R 21/26
(52) U.S. Cl. ...................................... 280/737; 280/741
(58) Field of Search ................................ 280/736, 737, 280/740, 741, 742; 137/68.19, 68.21, 68.23, 68.25

(56) References Cited

U.S. PATENT DOCUMENTS

| | | | |
|---|---|---|---|
| 3,752,500 A | * | 8/1973 | Culver ........................ 280/736 |
| 3,787,067 A | * | 1/1974 | Bernard ...................... 280/736 |
| 5,350,192 A | | 9/1994 | Blumenthal |
| 5,351,989 A | | 10/1994 | Popek et al. |
| 5,454,592 A | | 10/1995 | Blumenthal et al. |
| 5,464,247 A | | 11/1995 | Rizzi et al. |
| 5,551,723 A | * | 9/1996 | Mahon et al. .............. 280/737 |
| 5,590,906 A | | 1/1997 | Faigle et al. |
| 5,609,362 A | | 3/1997 | Sparks et al. |
| 5,618,057 A | * | 4/1997 | Johnson et al. ............ 280/736 |
| 5,620,204 A | | 4/1997 | Frey |
| 5,664,804 A | | 9/1997 | Saccone |
| 5,820,162 A | * | 10/1998 | Fink ........................... 280/742 |
| 5,863,066 A | | 1/1999 | Blumenthal |
| 5,863,067 A | | 1/1999 | Blumenthal et al. |
| 5,927,753 A | * | 7/1999 | Faigle et al. ................ 280/735 |

* cited by examiner

Primary Examiner—Paul N. Dickson
Assistant Examiner—Faye M. Fleming
(74) Attorney, Agent, or Firm—Tarolli, Sundheim, Covell, Tummino & Szabo L.L.P.

(57) ABSTRACT

An inflator (10) for inflating a vehicle occupant protection device (34) comprises a vessel (12) containing stored gas (54) and ignitable material (62). The vessel (12) has a portion (30) that provides a first opening for fluid to flow from the vessel when the pressure in the vessel reaches a predetermined pressure. The inflator (10) also comprises an igniter (72) for igniting the ignitable material (62) and increasing the pressure in the vessel (12). The inflator (10) also comprises a control part (40) upstream of the portion (30) for controlling fluid flow to the first opening. The control part (40) defines a second opening (46) that increases in size as the pressure in the vessel (12) increases.

19 Claims, 6 Drawing Sheets

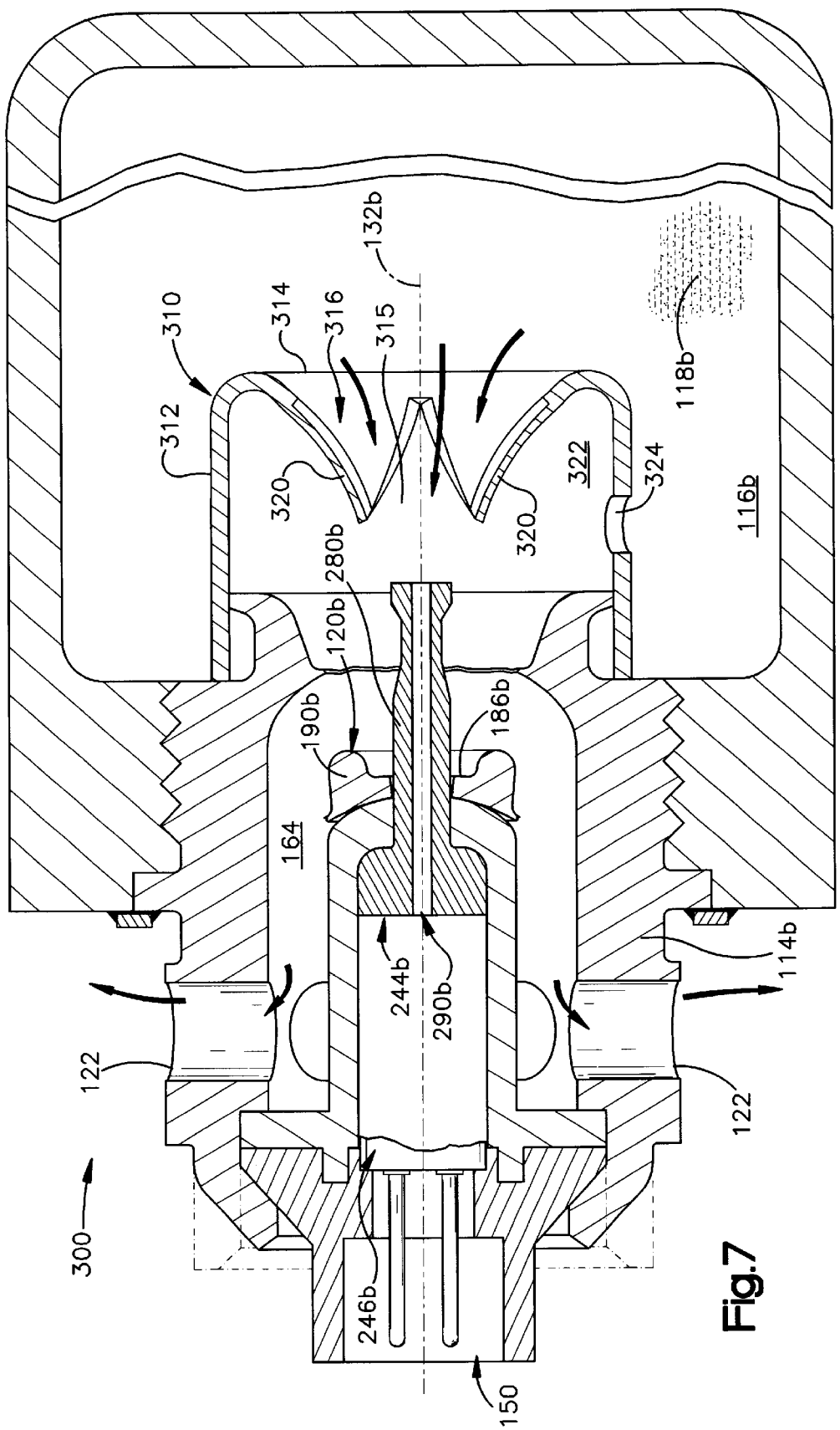

AIR BAG INFLATOR

BACKGROUND OF THE INVENTION

1. Technical Field

The present invention relates to an inflator for an inflatable vehicle occupant protection device, such as an air bag.

2. Description of the Prior Art

An inflator for an inflatable vehicle occupant protection device, such as an air bag, includes a source of inflation fluid. The source of inflation fluid may be a stored quantity of pressurized inflation fluid, or a combination of pressurized inflation fluid and ignitable material for heating the inflation fluid. The ignitable material may be a solid material or may be a fuel gas, which is mixed in with the pressurized inflation fluid.

An inflator typically includes an initiator, which is actuated electrically when the air bag is to be inflated. Actuation of the initiator effects flow of inflation fluid from the inflator into the air bag to inflate the air bag. Certain of such inflators have an inflation fluid outlet with a flow area that varies in accordance with the pressure of inflation fluid in the housing.

SUMMARY OF THE INVENTION

The present invention is an inflator for inflating a vehicle occupant protection device. The inflator comprises a vessel containing stored gas and ignitable material. The vessel has a portion that provides a first opening for fluid to flow from the vessel when the pressure in the vessel reaches a predetermined pressure. The inflator also comprises an igniter for igniting the ignitable material and increasing the pressure in the vessel. The inflator also comprises a control part upstream of the portion for controlling fluid flow to the first opening. The control part defines a second opening that increases in size as the pressure in the vessel increases.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 7 is a view similar to FIG. 6, showing the inflator of FIG. 6 in an actuated condition.

DETAILED DESCRIPTION OF EMBODIMENTS OF THE INVENTION

Figure 1:
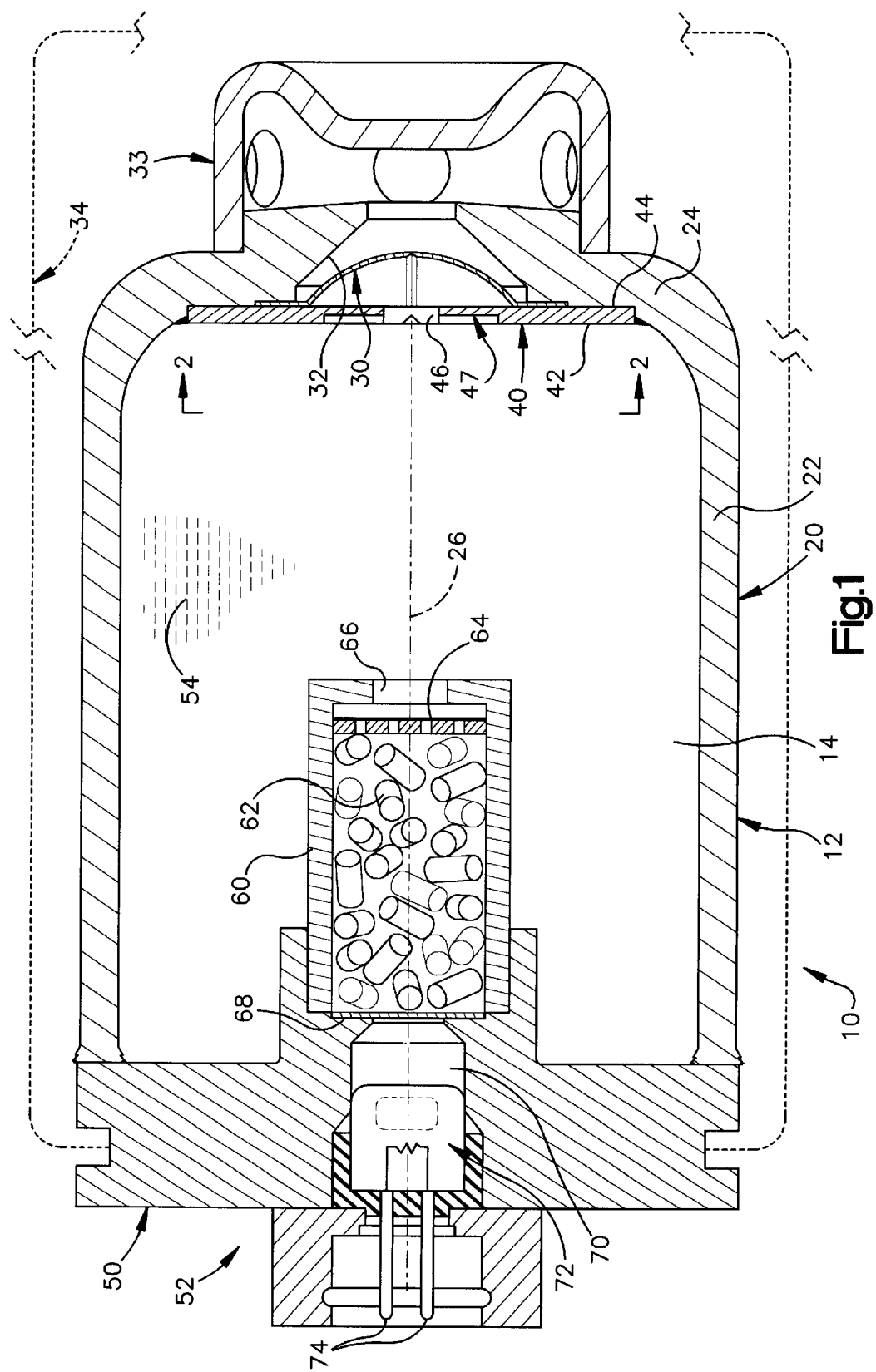
FIG. 1 is a sectional view of an inflator constructed in accordance with a first embodiment of the present invention, shown in a condition prior to actuation.

The present invention relates to an inflator for an inflatable vehicle occupant protection device, such as an air bag. Other inflatable vehicle occupant protection devices that can be used in accordance with the invention include, for example, inflatable seat belts, inflatable knee bolsters, inflatable head liners, inflatable side curtains, and knee bolsters operated by inflatable air bags. The present invention is applicable to various inflator constructions. As representative of the present invention, FIG. 1 illustrates an inflator 10.

The inflator 10 includes a container 12, which defines a gas storage chamber 14. The container 12 has a main body portion 20. The main body portion 20 of the container 12 has a generally cylindrical configuration including a cylindrical, axially extending side wall 22 and a generally radially extending end wall 24. The side wall 22 of the container 12 is centered on a longitudinal central axis 26 of the inflator 10.

A rupturable primary burst disk 30 closes an opening 32 in the end wall 24 of the container 12. A diffuser 33 is secured to the end wall 24 outside the primary burst disk 30. The diffuser 33 is in fluid communication with an inflatable vehicle occupant protection device in the form of an air bag indicated schematically at 34.

The inflator includes a flow control member in the form of an orifice plate 40. The orifice plate 40 in the illustrated embodiment has a planar, disk-shaped configuration including parallel, circular inner and outer major side surfaces 42 and 44. The orifice plate 40 may, alternatively, have a different configuration.

The orifice plate 40 is welded to the end wall 24 of the container 12 at a location centered on the axis 26. The orifice plate 40 is located between the gas storage chamber 14 and the primary burst disk 30, and is thus "upstream" of the primary burst disk. The orifice plate 40 has a circular central opening 46 centered on the axis 26.

The orifice plate 40 has a predetermined portion 47 having an annular configuration adjacent to and surrounding the central opening 46. The portion 47 of the orifice plate 40 has a plurality of score lines which extend partially through the portion 47 to weaken it. Alternatively and preferably, the portion 47 could have cut lines which extend entirely through the portion 47. Moreover, the portion 47 could have both cut lines and score lines. In the illustrated embodiment, the rupturable portion 47 has four score or cut lines 48 (FIG. 2), which extend radially outward from the central opening 46.

Figure 2:
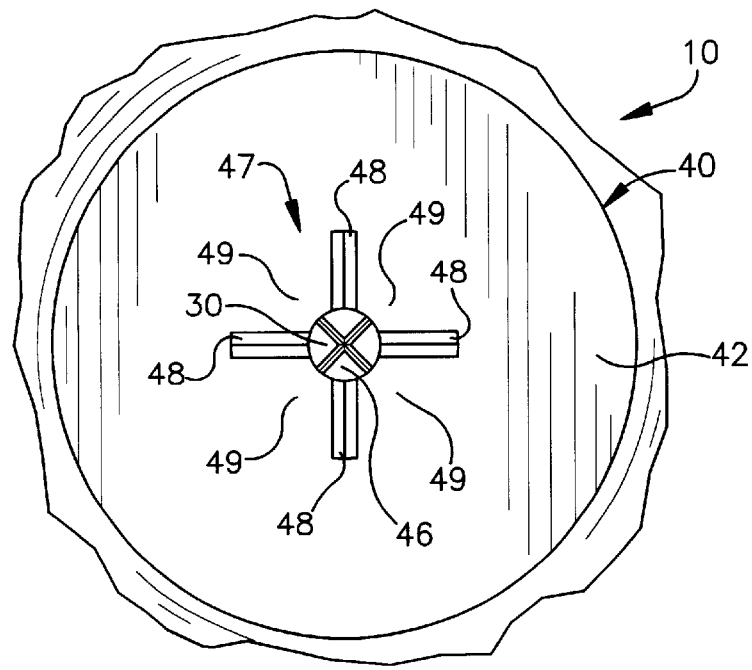
FIG. 2 is a view taken along line 2—2 of FIG. 1 showing an orifice plate which forms part of the inflator of FIG. 1.

The lines 48 divide the rupturable portion 47 of the orifice plate 40 into a plurality of generally triangular petals 49. When the inflator 10 is in the unactuated condition shown in FIG. 1, the central opening 46 has an initial size or flow area as shown in FIGS. 1 and 2, the lines 48 are not open, and the orifice plate 40 is undeformed. The portion 47 is deformable, as described below, upon the application of a predetermined amount of force to the orifice plate 40.

The container 12 also includes a bulkhead 50. The bulkhead 50 is welded to the side wall 22 of the container 12 at the end of the container opposite the primary burst disk 30. The bulkhead 50, together with an actuatable initiator 52 described below, closes the end of the container 12 opposite the primary burst disk 30.

A quantity of fluid 54 is disposed in the storage chamber 14. The fluid 54 is stored at a pressure in the range of about 1,500 psig to about 6,000 psig. The fluid 54 preferably comprises a mixture of gases including a primary gas and oxygen. The primary gas comprises the majority of the inflation fluid that inflates the air bag 34. The oxygen, when combined with the combustion products of a gas generant 62, heats the primary gas to increase the pressure and temperature of the fluid 54 in the chamber 14.

The initiator 52 includes a generant housing 60 secured to the bulkhead 50. The generant housing 60 extends into the chamber 14. The initiator 52 also includes a quantity of the known pyrotechnic material 62, or gas generant material, disposed in the generant housing 60. A filter plate and seal assembly 64 extends across an opening 66 in one end of the generant housing 60. A burst disk 68 secured to the bulkhead 50 extends across and closes the opposite end of the generant housing 60.

The bulkhead 40 defines an igniter chamber 70. The igniter chamber 70 is disposed adjacent to the burst disk 68 and, thus, adjacent to the generant 62. The initiator 52 includes an electrically energizable igniter 72, which is located in the igniter chamber 70. The igniter 72 is a known device such as a pyrotechnic squib which, when energized, produces combustion products for igniting the generant 62.

The terminals 74 of the first igniter 72 are connected with vehicle electric circuitry (not shown) including a power source, which is preferably a vehicle battery and/or a capacitor, and a normally open switch. The switch is part of a sensor that senses a vehicle condition indicating the occurrence of a collision. The collision-indicating condition may comprise, for example, sudden vehicle deceleration that is caused by a collision. If the collision-indicating condition is at or above a predetermined threshold level, it indicates the occurrence of a collision having at least a predetermined threshold level of severity. The threshold level of collision severity is a level at which inflation of the air bag 34 or other vehicle occupant protection device is desired to help protect an occupant of the vehicle.

When the sensor senses a collision-indicating condition at or above the predetermined threshold level, the switch closes and the igniter 72 is energized electrically to actuate the initiator 52. The igniter 72 produces hot combustion products, which fill the igniter chamber 70 and rupture the burst disk 68. The combustion products of the igniter 72 ignite the generant 62. The ignition of the generant 62 results in heating of the gas 54 in the chamber 14, causing an increase in the pressure in the chamber.

The increased gas pressure is transmitted through the central opening 46 in the orifice plate 40 to the primary burst disk 30. The primary burst disk 30 ruptures because of the pressure increase in the chamber 14. The fluid 54 flows out of the chamber 14, through the opening 32 in the container end wall 24. The fluid 54 is directed by the diffuser 33 into the air bag 34 to inflate the air bag.

Figure 3:
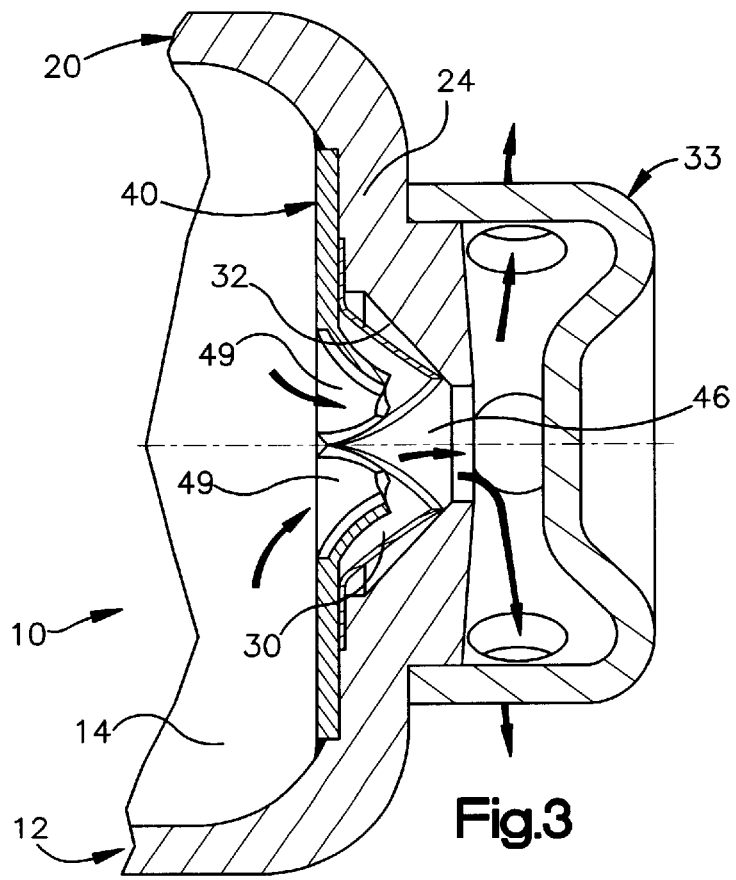
FIG. 3 is a sectional view of a portion of the inflator of FIG. 1, shown in an actuated condition.

If the pressure in the chamber 14 increases beyond a predetermined pressure, the force on the portion 47 of the orifice plate 40 exceeds the predetermined amount of force. The portion 47 of the orifice plate 40 may begin to open along the lines 48, starting at the central opening 46 and extending radially outward from the central opening in a direction toward the outer periphery of the orifice plate 40. If the portion 47 has score lines, the portion 47 will tear along the score lines. If the portion 47 has cut lines, the cut lines will open. In either case, the portion 47 of the orifice plate 40 forms generally triangular petals 49 (FIG. 3), which bend away from the plane of the orifice plate 40 in a direction toward the primary burst disk 30. As this petaling movement occurs, the central opening 46 in the orifice plate 40 enlarges, providing an increasingly large flow area for inflation fluid 54 to exit the inflator 10. The larger flow area of the orifice plate 40 can compensate for the increased pressure in the gas storage chamber 14. Thus, the orifice plate 40 provides a pressure relieving mechanism for the inflator 10. Specifically, the amount of petaling of the orifice plate 40 depends on the pressure in the chamber 14—the greater the pressure in the chamber, the more the orifice plate petals open.

Figure 4:
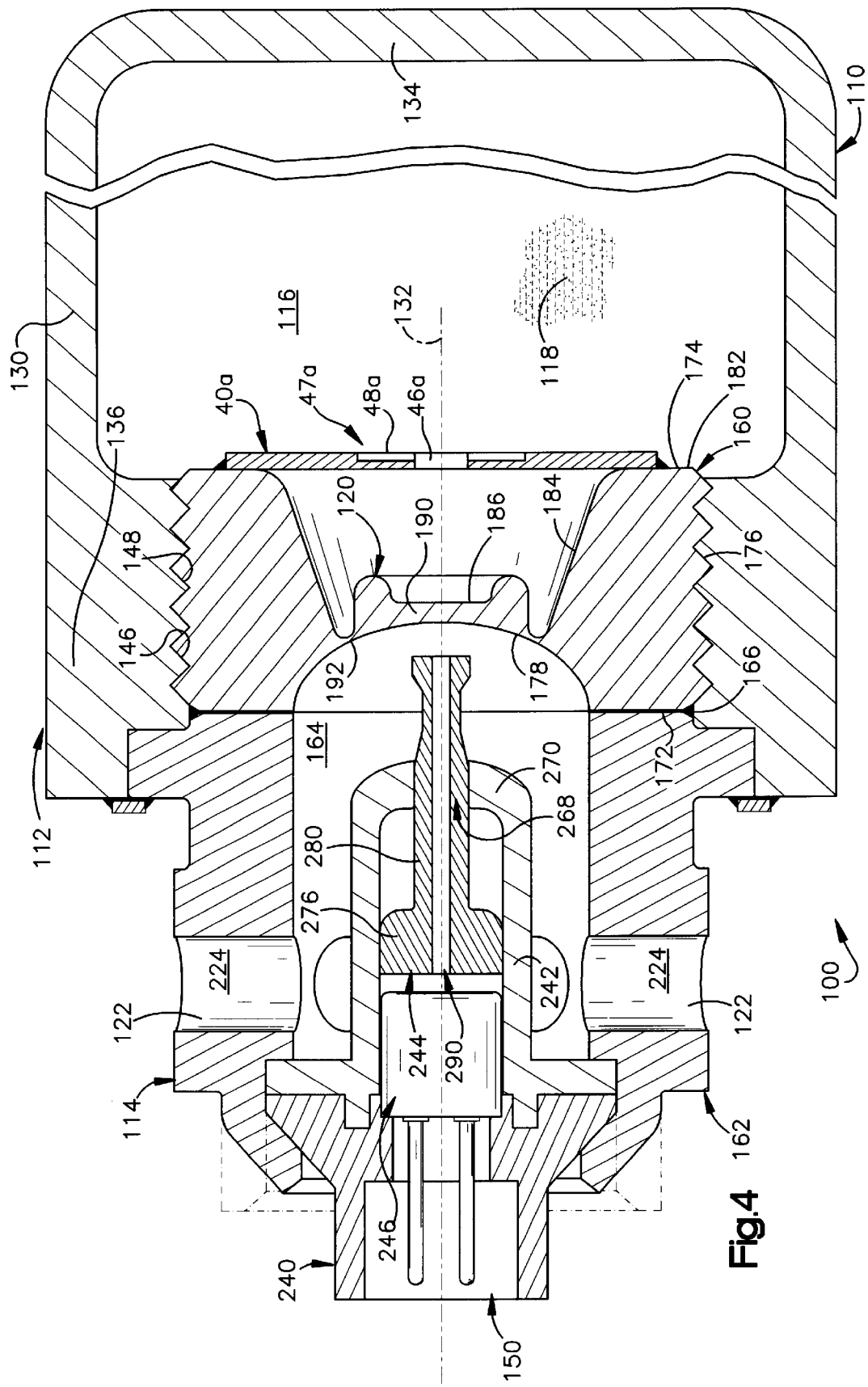
FIG. 4 is a sectional view of an inflator constructed in accordance with a second embodiment of the present invention, shown in a condition prior to actuation.
Figure 5:
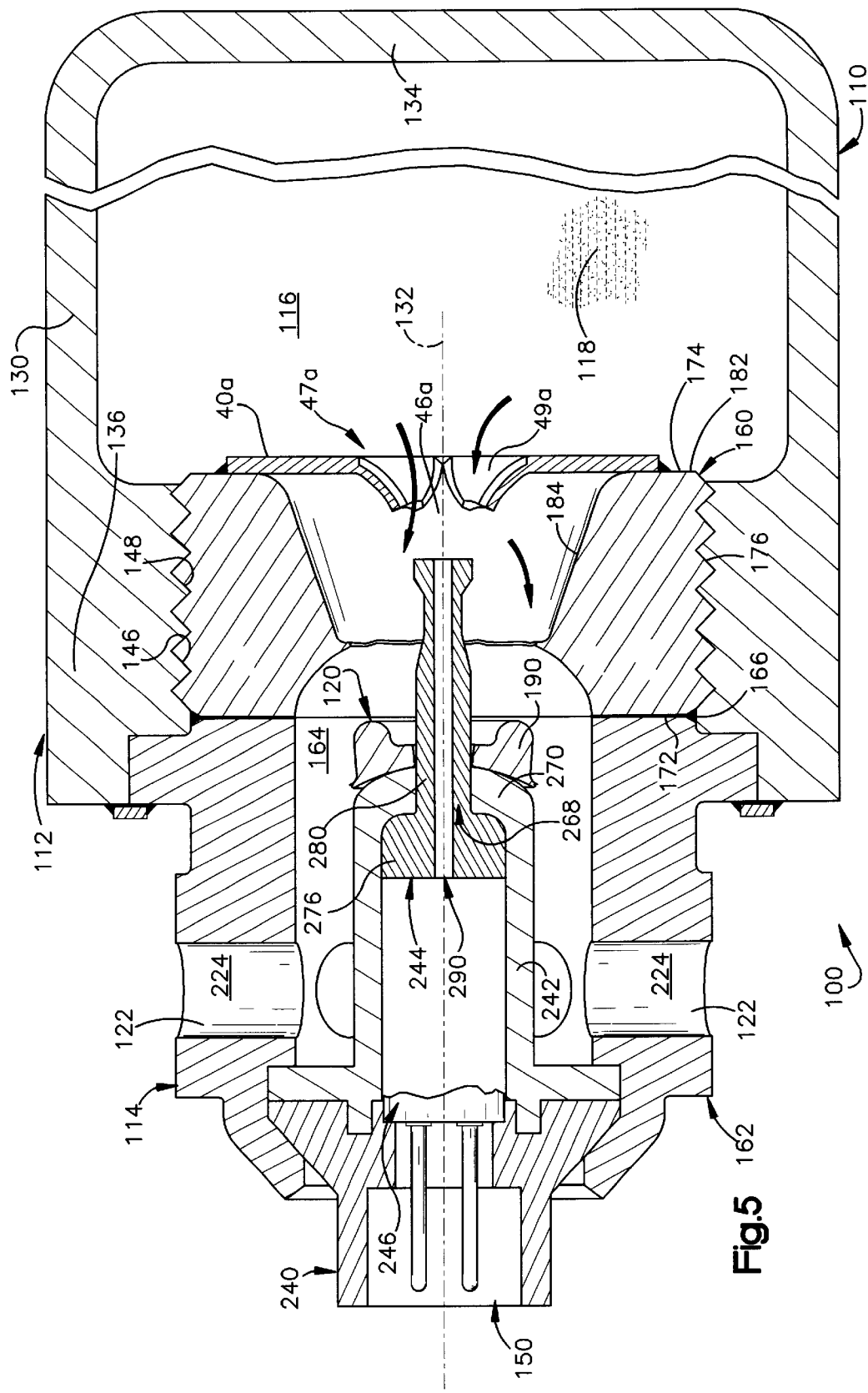
FIG. 5 is a view similar to FIG. 4, showing the inflator of FIG. 4 in an actuated condition.

FIGS. 4 and 5 illustrate an inflator 100 in accordance with a second embodiment of the invention. The inflator is similar to the inflator shown in U.S. Pat. No. 5,863,067. The inflator 100 includes an orifice plate 40a similar to the orifice plate 40 described above with reference to FIGS. 1–3.

Specifically, the inflator 100 includes a pressure vessel 110. The pressure vessel 110 includes a tank 112 and an end plug 114, which closes the tank 112. The tank 112 has a gas storage chamber 116 containing fluid 118 under pressure. The end plug 114 has a rupturable closure wall 120. The closure wall 120 is exposed to the pressure in the storage chamber 116, and blocks the fluid 118 from flowing out of the storage chamber 116. When the pressure vessel 110 is opened as described below, the closure wall 120 is ruptured and the fluid 118 is released to flow out of the storage chamber 116 past the closure wall 120. The fluid 118 then flows outward through the end plug 114 and further outward from the pressure vessel 110 through a plurality of outlet openings 122 in the end plug 114.

The tank 112 includes a cylindrical body wall 130 centered on a longitudinal central axis 132. The tank 112 further has a circular end wall 134 at one end of the body wall 130 and a neck 136 at the opposite end of the body wall 130. A cylindrical inner surface 146 of the neck 136 has a screw thread 148. The fluid 118 preferably comprises a combustible mixture of gases including a fuel gas, an oxidizer gas, and an inert gas.

The end plug 114 closes the tank 112 and supports an initiator assembly 150 in a position centered on the axis 132. As shown in FIG. 4, the end plug 114 includes first and second plug parts 160 and 162. The first plug part 160 includes the closure wall 120. The first plug part 160 has a screw thread 176 engaged with the screw thread 148 on the neck 136 of the bottle 112. An outer end surface 172 of the first plug part 160 has a concave, circular central portion 178 extending diametrically across the axis 132.

An inner end surface 174 of the first plug part 160 has a planar, annular peripheral portion 182 perpendicular to the axis 132. The inner end surface 174 further has a frusto-conical intermediate portion 184, which is tapered radially inward from the peripheral portion 182. A central portion 186 of the inner end surface 174 is bounded by the intermediate portion 184, and also extends across the axis 132. The closure wall 120 is defined by the material of the first plug part 160 that is located axially between the central portions 186 and 178 of the inner and outer end surfaces 172 and 174.

Thus, the closure wall 120 extends diametrically across the axis 132 at the center of the first plug part 160, and has a disk-shaped central portion 190 bounded by a thin, annular peripheral portion 192. The peripheral portion 192 of the closure wall 120 is constructed as a stress riser, which is rupturable under the influence of a predetermined elevated fluid pressure acting outward against the closure wall 120 from the storage chamber 116. Accordingly, the central portion 190 of the closure wall 120 is constructed as a predefined breakaway part that becomes severed from the peripheral portion 192 upon rupturing of the peripheral portion.

The second plug part 162 is constructed as an outlet manifold with a fluid flow conduit 164 communicating the closure wall 120 with the outlet openings 122. The second plug part 162 (FIG. 2) has a plurality of outlet passages 224, which communicate the conduit 164 with the outer openings 122. A friction weld 166 fixes the first and second plug parts 160 and 162 to each other.

The initiator assembly 150 has an elongate, two-part housing 240 extending longitudinally along the axis 132 of the tank 112. One part 242 of the housing 240 is a tubular cylinder. The cylinder 242 has an end wall 270. The cylinder 242 contains a needle or probe 244 and an electrically actuatable initiator 246. The probe 244 has a short cylindrical base 276 and a shaft 280 projecting axially from the base. The shaft 280 extends through an opening 268 in the end wall 270 of the cylinder. A cylindrical passage 290 extends entirely through the probe 244 along the axis 132.

The orifice plate 40a in the inflator 100 acts as a flow control member. The orifice plate 40a is similar in configuration to the orifice plate 40 described above with respect to the first embodiment of the invention, and is given the same reference numerals with the suffix "a" added to distinguish. In the illustrated embodiment, the orifice plate 40a is welded to the inner end surface 174 of the first plug part 160. The orifice plate 40a is located between the gas storage chamber 116 and the closure wall 120, and is thus "upstream" of the closure wall. The orifice plate 40a has a central opening 46a and a portion 47a which has cut lines or score lines 48a or a combination of cut and score lines.

The initiator 246, when actuated, produces combustion products including heat, hot particles, and hot gases. The combustion products develop a thrust, which propels the probe 244 along the axis 132 from left to right, as viewed in the drawings. As the probe 244 approaches the position in which it is shown in FIG. 5, the shaft 280 of the probe moves forcefully against and through the closure wall 120 so as to puncture an opening through the center of the closure wall 120. As the probe 244 reaches the position of FIG. 5, the base 276 of the probe 244 moves into abutting engagement with the end wall 270 of the cylinder 242. The probe 244 stops in an actuated position in which the shaft 280 projects axially through the opening in the closure wall 120.

The opening in the closure wall 120 is a first outlet orifice through which the mixture of gases 118 initially begins to exit the gas storage chamber 116. The pressure of the gases 118 in the chamber 116 then forces the breakaway part 190 of the closure wall 120 to be severed and moved away from the peripheral portion 192. The probe 244 guides the breakaway part 190 to move axially to the position in which it is shown in FIG. 5. The breakaway part 190 is thereafter held against the end wall 270 by the pressure of the gases 118 flowing outward through the conduit 164.

The gases 118 flowing out of the chamber 116 must flow through the central opening 46a in the orifice plate 40a before they reach the conduit 164. If the pressure in the chamber 116 increases beyond a predetermined pressure, the portion 47a of the orifice plate 40a begins to open, starting at the central opening 46a and extending outward from the central opening in a direction toward the outer periphery of the orifice plate. The portion 47a of the orifice plate 40a forms petals 49a which bend away from the plane of the orifice plate 40a in a direction toward the conduit 164 as described above in connection with the embodiment of FIG. 1.

As this petaling movement occurs, the central opening 46a in the orifice plate 40 enlarges, providing an increasingly larger flow area for inflation fluid to exit the inflator 100. This larger flow area can compensate for the increased pressure in the gas storage chamber 116. Thus, the orifice plate 40a provides a pressure relieving feature for the inflator 100. The amount of petaling of the orifice plate 40a depends on the pressure in the chamber 116—the greater the pressure in the chamber, the more the orifice plate petals open.

Figure 6:
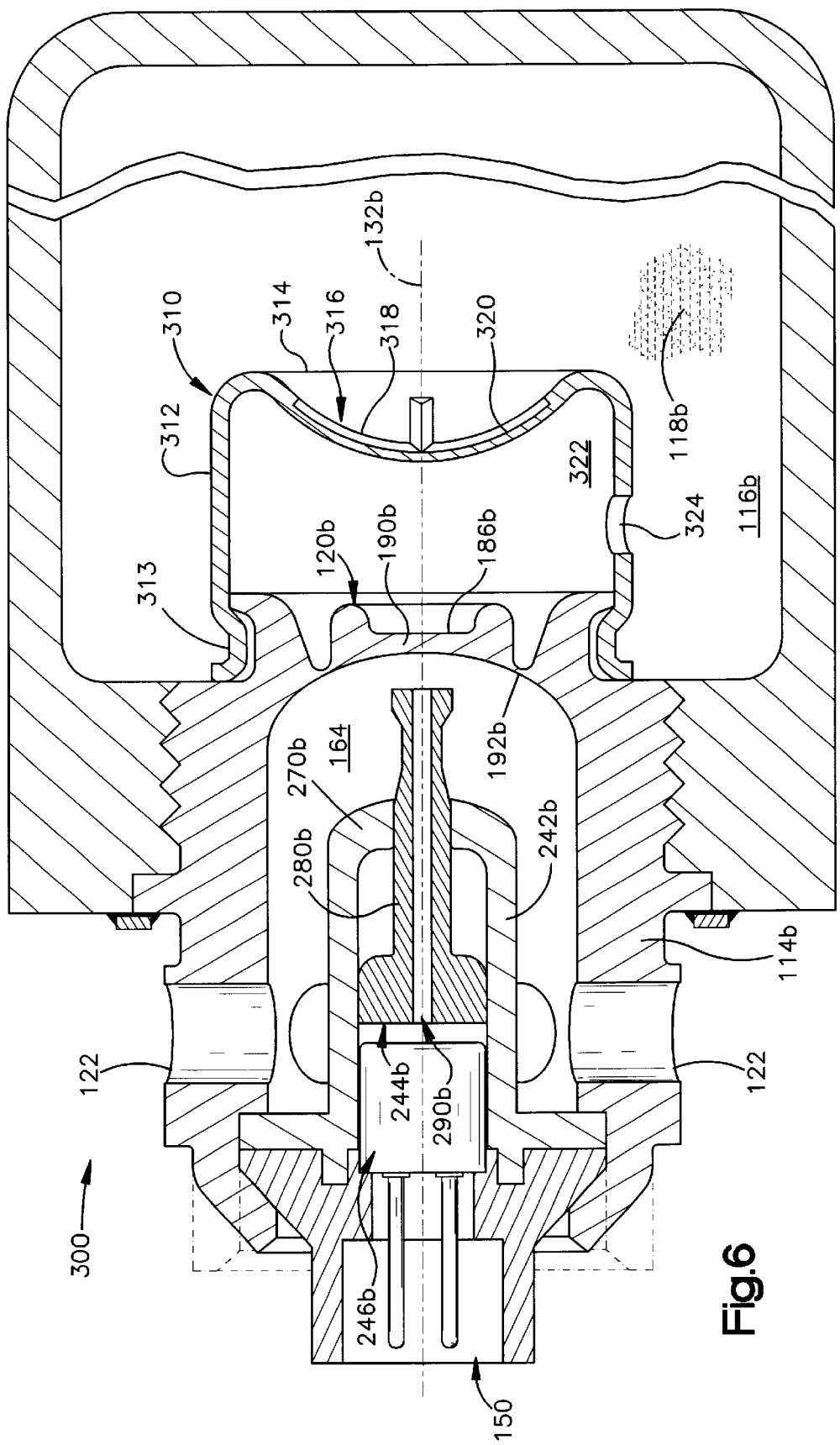
FIG. 6 is a sectional view of an inflator constructed in accordance with a third embodiment of the present invention, shown in a condition prior to actuation.

FIGS. 6 and 7 illustrate an inflator 300 constructed in accordance with a third embodiment of the invention. The inflator is similar to the inflator 100 (FIGS. 4–5), and parts that are the same or similar are given the same reference numeral with the suffix "b" added to distinguish them.

The inflator 300 includes a one-piece end plug 114b. The end plug 114b supports an initiator 150b, which includes an igniter 246b, a cylinder 242b, and a probe 244b.

In place of the orifice plate 40a, the inflator 300 includes an ignition cup 310. The ignition cup 310 is a one-piece metal member having a cup-shaped configuration including a cylindrical side wall 312 centered on the axis 132b. The side wall has an end portion 313 crimped or otherwise affixed to the end plug 114b. The ignition cup 310 is located between the gas storage chamber 116b and the closure wall 120b, and is thus "upstream" of the closure wall.

The ignition cup 310 has a base or end wall 314, which caps the side wall 312. The end wall 314 has a concave configuration bowed in toward the closure wall 120b. The end wall 314 has a centrally located, predetermined cut portion 316. The cut portion 316 of the end wall 314 preferably has one or more cut lines 318 that extend outward from the center of the end wall in a direction toward the side wall 312. The cut lines extend entirely through the end wall 314.

The cut lines 318 divide the portion 316 of the ignition cup 310 into a plurality of generally triangular petals 320. When the inflator 300 is in the unactuated condition shown in FIG. 6, there is no opening in the end wall 314, the cut lines 318 are closed, and the ignition cup 310 is not opened.

The ignition cup 310 has an internal chamber 322. An opening 324 is located in the side wall 312 of the ignition cup 310. The opening 324 establishes fluid communication between the internal chamber 322 of the ignition cup 320 and the gas storage chamber 116b. Because of the presence of the opening 324 in the side wall 312 of the ignition cup 310, the chamber 322 inside the ignition cup contains the same mixture of fuel gas and stored gas as does the remainder of the gas storage chamber 116b of the inflator 300.

The initial operation of the inflator 300 is similar to the operation of the inflator 100 (FIGS. 4–5). When the initiator 246b is actuated, the shaft 280b of the probe 244b moves forcefully against and through the closure wall 120b so as to puncture an opening through the center of the closure wall. The probe 244b stops in an actuated position in which the shaft 280b projects axially through the opening in the closure wall 120b.

Combustion products including flame from the initiator 246b flow through the central passage 290b in the probe 244b. The jet of flame from the probe 244b ignites the fuel gas in the internal chamber 322 of the ignition cup 310 increasing the pressure in chamber 322. The opening 324 communicates the combustion products of the initiator 246b, as well as the combustion products of the fuel gas in the chamber 322, to the fuel gas in the interior of the gas storage chamber 116b. The fuel gas in the interior of the gas storage chamber 116b ignites, increasing the pressure in the chamber 116b.

The pressure of the gases in the chamber 3 then forces the breakaway part 190b of the closure wall 120b to be severed and moved away from the peripheral portion 192b. The probe 244b guides the breakaway part 190b to move axially to the position in which it is shown in FIG. 7. The breakaway part 190b is thereafter held against the end wall 270b by the pressure of the gases 118b flowing outward through the conduit 164b. The gas flowing out of the chamber 322 flows through the opening into conduit 164b thus lowering the pressure in chamber 322. The time for this to occur is longer at low ambient temperatures as the gas pressure in chamber 322 must rise from a lower value to reach the rupture pressure of part 190b at lower ambient temperatures. Thus, more flame is injected into storage chamber 116b at relatively low ambient temperatures prior to part 190b rupturing as compared to at relatively high ambient temperatures providing for temperature compensation (i.e., longer heating of the gas in chambers 322 and 116b at lower ambient temperatures).

In this manner, the ignition cup 310 provides a temperature regulating function in the inflator 300, by controlling the time of opening of the inflator depending on the ambient temperature of the inflator. Specifically, if the ambient temperature of the inflator 300 at actuation is relatively low, a longer period of time is required to increase the pressure in the chamber 322 sufficiently to rupture the end wall 190b of the closure wall 120b than if the ambient temperature of the inflator is relatively high. The ignition cup 310 provides shorter delays in opening inflator 300 as compared to a similar inflator that does not contain ignition cup 310 because only the gas in relatively small chamber 322 must rise to a sufficient pressure to rupture the end wall 190b. But the delay is an ambient temperature variable delay that allows more flame injection into inflator 300 when the inflator is cold as compared to hot due to ambient temperature.

In response to an increasing pressure difference between chamber 116b and chamber 322, the portion 316 of the end wall 314 of the ignition cup 310 opens. The end wall 314 petals inwardly (in a direction toward the probe 244) to define a flow control opening 315 (FIG. 7) in the end wall 314 of the ignition cup 310 for directing gas to the closure wall 120b. The opening 315 in the ignition cup 310 is an outlet orifice through which the mixture of gases 118b exits the gas storage chamber 116b.

The gas flowing out of the chamber 116b flows through the opening 315 in the end wall 314 of the burst cup 310 before it reaches the conduit 164b. Some gas flows out of the chamber 116b through the opening 324 in the side wall 312 of the burst cup 310. As the pressure in the chamber 116b increases, the portion 316 of the ignition cup 310 opens to a greater extent, increasing the size of the fluid flow opening in the end wall 314 of the ignition cup. As this occurs, the ignition cup 310 provides an increasingly larger flow area for inflation fluid to exit the inflator 300. This larger flow area can compensate for the increased pressure in the gas storage chamber 116b. Thus, the ignition cup 310 provides a pressure relieving feature for the inflator 300.

From the above description of the invention, those skilled in the art will perceive improvements, changes and modifications in the invention. Such improvements, changes and modifications within the skill of the art are intended to be covered by the appended claims.

Having described the invention, I claim:

1. An inflator for inflating a vehicle occupant protection device, said inflator comprising:
a vessel containing stored gas and ignitable material, said vessel having a portion that provides a first opening for fluid to flow from said vessel when the pressure in said vessel reaches a predetermined pressure;
an igniter for igniting said ignitable material and increasing the pressure in said vessel; and
a control part upstream of said portion for controlling fluid flow to said first opening, said control part defining a second opening that increases in size as the pressure in said vessel increases.

2. An inflator as defined in claim 1 wherein said portion comprises a burst disk which ruptures when the pressure in said vessel reaches a predetermined pressure.

3. An inflator as defined in claim 2 wherein said control part comprises a member affixed to said vessel, said member having said second opening through said member for communicating the pressure in said vessel to said burst disk and for directing gas from said vessel, said member having at least one portion movable in response to increasing pressure in said vessel to increase the flow area of said second opening as pressure in said vessel increases.

4. An inflator as defined in claim 3 wherein said ignitable material comprises solid gas generating material.

5. An inflator as defined in claim 1 wherein said ignitable material comprises a fuel gas mixed with said stored gas.

6. An inflator for inflating a vehicle occupant protection device, said inflator comprising:
a vessel containing stored gas and ignitable material, said vessel having a portion that provides a first opening for fluid to flow from said vessel when the pressure in said vessel reaches a predetermined pressure;
an igniter for igniting said ignitable material and increasing the pressure in said vessel; and
a control part upstream of said portion for controlling fluid flow to said first opening, said control part defining a second opening that increases in size as the pressure in said vessel increases;
wherein said portion comprises a burst disk which ruptures when the pressure in said vessel reaches a predetermined pressure;
wherein said ignitable material comprises a fuel gas mixed with said stored gas; and
further including a hollow needle that moves through said portion of said vessel and directs combustion products into said vessel to ignite said fuel gas upon actuation of said igniter, the increase in pressure causing said portion to separate from said vessel and define said first opening for gas to flow from said vessel.

7. An inflator as defined in claim 6 wherein said control part comprises a member affixed to said vessel, said member having said second opening through said member for communicating the pressure in said vessel to said portion and for directing gas from said vessel, said member having at least one portion movable in response to increasing pressure in said vessel to increase the flow area of said opening as pressure in said vessel increases.

8. An inflator for inflating a vehicle occupant protection device, said inflator comprising:
a vessel containing stored gas and ignitable material, said vessel having a portion that provides a first opening for fluid to flow from said vessel when the pressure in said vessel reaches a predetermined pressure;
an igniter for igniting said ignitable material and increasing the pressure in said vessel; and
a control part upstream of said portion for controlling fluid flow to said first opening, said control part defining a second opening that increases in size as the pressure in said vessel increases;
wherein said control part further increases the time of burning of said ignitable material if the temperature of said stored gas decreases.

9. An inflator as defined in claim 8 wherein said ignitable material comprises a fuel gas mixed with said stored gas.

10. An inflator for inflating a vehicle occupant protection device, said inflator comprising:

a vessel containing stored gas and an ignitable material, said vessel having a portion that provides a first opening for fluid to flow from said vessel when the pressure in said vessel reaches a predetermined pressure;

an igniter for igniting said ignitable material and increasing the pressure in said vessel, and a control part for increasing the time of burning of said ignitable material if the temperature of said stored gas decreases, said control part comprising a cup in said vessel and having a chamber containing ignitable material, said cup having a second opening communicating said chamber with the interior of said vessel.

11. An inflator as defined in claim 10 wherein said ignitable material comprises a fuel gas mixed with said stored gas.

12. An inflator as defined in claim 11 wherein said igniter, when actuated, ignites the fuel gas in said chamber and said second opening communicates combustion products to the fuel gas in the interior of said vessel to ignite the fuel gas in the interior of said vessel to increase the pressure in the interior of said vessel.

13. An inflator as defined in claim 12 further including a hollow needle that moves through said portion of said vessel and directs combustion products into said chamber to ignite the fuel gas in said chamber, said portion rupturing and separating from said vessel to define said first opening for gas to flow from said vessel.

14. An inflator as defined in claim 12 wherein said cup comprises a base having a portion which moves in response to increasing pressure in said vessel to define a flow control third opening for directing gas to said first opening, the area of said flow control third opening increasing with increasing pressure in said vessel.

15. An inflator for inflating a vehicle occupant protection device, said inflator comprising:

a vessel having a chamber containing stored gas and ignitable material, said vessel having a portion that defines a first opening for fluid to flow from said vessel when the pressure in said vessel reaches a predetermined pressure;

an igniter for igniting said ignitable material and increasing the pressure in said vessel; and a control part upstream of said first opening in the path of fluid flow from said chamber to said first opening for controlling fluid flow from said chamber to said first opening, said control part defining a second opening upstream of said first opening, said second opening increasing in size as the pressure in said vessel increases while fluid is flowing through said first opening.

16. An inflator as defined in claim 15 wherein said portion comprises a burst disk which ruptures when the pressure in said vessel reaches a predetermined pressure to enable fluid that is flowing from said chamber through said second opening to flow out of said inflator through said first opening.

17. An inflator as defined in claim 16 wherein said control part comprises a member affixed to said vessel, said member having said second opening through said member for communicating the pressure in said vessel to said burst disk and for directing gas from said vessel, said member having at least one portion movable in response to increasing pressure in said vessel upstream of said first opening to increase the flow area of said second opening as pressure in said vessel increases.

18. An inflator as defined in claim 17 wherein said ignitable material comprises solid gas generating material.

19. An inflator as defined in claim 15 wherein said ignitable material comprises a fuel gas mixed with said stored gas.

* * * * *